Patented Apr. 5, 1932

1,852,510

UNITED STATES PATENT OFFICE

PEDER FARUP, OF VETTAKOLLEN, VESTRE AKER, NORWAY, ASSIGNOR TO TITAN CO. A/S, OF FREDRIKSSTAD, NORWAY

PROCESS OF TREATING TITANIFEROUS MATERIALS WITH ACID

No Drawing. Application filed April 21, 1927, Serial No. 185,658, and in Norway August 3, 1926.

In order to bring titaniferous materials into solution or into easily soluble form acids are generally employed, especially mineral acids, such as sulphuric or hydrochloric acid, and the titaniferous materials are as a rule finely ground and treated with rather concentrated acids in the presence of heat.

It is the general object of my present invention to effect a marked economy in the treatment of titaniferous materials by providing a process which without having great demands as concerns the fineness of the titaniferous materials, and the concentration of the acid employed, at the same time results in a quick and sufficiently complete dissolution of the titaniferous materials used, such, for example, as ilmenite, rutile, titanite, etc.

I have found that such dissolution process will proceed much more quickly and advantageously than hitherto known when certain additions to the reacting substances are used. The effect of such additions is remarkable, as well in processes where complete dissolution is desired as in processes in which it is sought to bring the titaniferous material into soluble form, such for example as by transformation into more or less soluble sulphates. The additions referred to further have the advantage that coarser titanium materials and less concentrated acids may be used for the treatment, and at the same time a rapidly and satisfactorily proceeding process will be obtained.

The additions, which according to my present invention act as accelerators for the reaction between the acids and the titaniferous materials may be of different kinds. For instance, I have found that naturally occurring substances, for example, magnetic pyrite, have the desired effect. I have found by addition of magnetic pyrite to ilmenite which was dissolved in about 75% sulphuric acid, it was possible to bring the time of reaction down to about one half of what it was without such addition, and at the same time the trivalent iron present in the solution was reduced to divalent. However, not all magnetic pyrites occurring in nature have such effect in the same degree, but I have found that the materials may acquire the desired effect by heating. Thus magnetic pyrite or ordinary pyrite heated to a temperature of about 700° C. has in most cases given the best results. I have also used iron sulphide prepared in various ways, as an addition, with good results. The additions, or reaction accelerators, may be used in the treatment of the titaniferous material either by adding them thereto, or by adding them to the acid; or, they may be introduced during the dissolution process itself.

I have found that the same excellent effect on the dissolution process is obtained with a series of other products. For instance I have employed products prepared by heating pyrite to ignition together with ilmenite. When heated to ignition the pyrite gives off one part of its sulphur, which has a reducing action on the ilmenite, while at the same time another part of the sulphur is bound by the reduction products formed. Similar desirable results have been obtained with products prepared by heating pyrite to ignition together with metallic iron. Instead of the metallic iron an oxidic compound may be used, for instance ordinary iron ore. It has in fact proven possible to employ a series of products prepared by heating two or more of the following components, viz.,—pyrite, magnetic pyrite, sulphur, titanium compounds, iron and iron compounds. As an example of the iron compounds used, I have employed iron sulphate crystallized out from the titanium iron solutions produced. The temperatures employed have varied between about 400° C. and about 1000° C. Where compounds of iron and sulphur are to be used low temperatures may be employed, while in those cases where reductions of the materials are to be effected higher temperatures are required. In the latter case temperatures from 700° C. to 800° C. will generally be found suitable.

I have found that a series of other natural or artificially produced sulphur compounds containing one or more metals and with varying sulphur content may be used as reaction accelerators or additions.

It will generally be most convenient to choose iron-sulphide compounds, but I am in no way limited thereto, as it may be advantageous to employ other metals together with iron. As examples of such metals may be mentioned zinc, aluminum, antimony, silicon, titanium, magnesium, alkali, and alkaline earth metal. If heated sulphur compounds are used it may in certain cases be advantageous to subject these to a rapid cooling by dropping them into water, or by cooling in other ways.

In many cases it may be of importance to obtain the desired acceleration of the dissolution process, sometimes under simultaneous reduction of the resulting solution, without adding foreign substances to the solution, or at least without any considerable increase of substances other than titanium compounds in the solution obtained. According to my present invention the desired result may be obtained by introducing sulphur into the titanium material to be treated or by adding a titanium material into which sulphur has been introduced. The sulphurization of titanium materials may take place for instance by heating them (for instance to about 700° C.) under the action of sulphur vapor or a gas mixture containing sulphur. This sulphurization may also be carried out in connection with a reduction of the titanium material by introducing a solid or gaseous reducing agent.

Sulphuretted hydrogen or sulphur dioxide may also be added during the dissolution process, and I have found that the presence of sulphur or sulphur compounds during such process has the further advantage that substances which form difficultly soluble sulphur compounds are precipitated out. These and all undissolved compounds remaining after the treatment may of course be treated in known ways for the recovery and separation of the single constituents.

I have found that the reduction products of titanium and similar materials without the simultaneous presence of sulphur compounds have a favorable effect on the dissolution process.

With regard to the amount of addition or reaction accelerator to be used in each special case in the treatment of titanium materials, no definite rule may be given, as the amount depends upon the character of the addition as well as on that of the reacting materials. It will however not be difficult to find the correct amount of addition, in each particular case, when the materials to be used are known. As an example it may be stated that in dissolving ilmenite in sulphuric acid, I have obtained excellent results by adding about 70 grams magnetic pyrite per kilogram ilmenite.

The titaniferous solution may be freed from suspended substances, if desired, and also freed from substances in colloidal form, and may be further treated according to known methods for production of titanium compounds and for hydrolytic precipitation of titanic acids, either alone or together with other substances.

The foregoing detailed description has been given for purposes of illustration, and no undue limitations should be deduced therefrom, but the appended claims should be construed as broadly as permissible in view of the prior art.

What I claim as new and desire to secure by Letters Patent is:

1. The process of rendering titaniferous materials soluble which comprises treating said materials with an acid in the presence of an iron sulphide having been previously subjected to heating and rapid cooling.

2. The process of rendering titaniferous materials soluble, which comprises treating said materials with an acid in the presence of magnetic pyrite.

3. The process of rendering titaniferous materials soluble, which comprises treating said materials with an acid in the presence of magnetic pyrite which has previously been subjected to heating.

4. The process of rendering titaniferous materials soluble, which comprises treating said materials with an acid in the presence of pyrite which has been subjected to heating and rapid cooling.

5. The process of rendering titaniferous materials soluble, which comprises treating said materials with an acid in the presence of magnetic pyrite which has been subjected to heating and rapid cooling.

6. The process of treating titaniferous materials, which comprises the direct dissolution of titanium from such materials by means of an acid in the presence of a sulphide.

7. The process of treating titaniferous materials, which comprises the direct dissolution of titanium from such materials by means of an acid in the presence of a reducing agent containing sulphur.

8. The process of treating titaniferous materials, which comprises the direct dissolution of titanium from said materials by means of an acid in the presence of a compound containing sulphur and titanium.

9. The process of treating titaniferous materials, which comprises the direct dissolution of titanium from such materials by means of an acid in the presence of an iron sulphide.

10. The process which comprises the direct dissolution of titanium from materials containing it by treating said materials with an acid in the presence of a sulphide which has previously been subjected to a heating.

11. The process of treating titaniferous materials which comprises the direct dissolution of titanium from such materials by means of an acid in the presence of pyrite.

12. The process of treating titaniferous materials, which comprises dissolving the titanium directly from said materials by means of an acid in the presence of pyrite which has previously been subjected to a heating.

13. The process of treating titaniferous materials, which comprises dissolving titanium directly from such materials by means of an acid in the presence of a reducing agent containing sulphur and a metal.

14. The process of treating titaniferous materials, which comprises directly dissolving titanium from such materials by means of an acid in the presence of a reducing agent, containing sulphur and a metal, which agent has previously been subjected to heating, together with a substance comprising iron.

15. The process of treating titaniferous materials, which comprises directly dissolving titanium from such materials by means of an acid in the presence of a reducing agent, containing sulphur and a metal, which agent has previously been subjected to heating, together with an iron oxide.

16. The process of treating titaniferous materials, which comprises directly dissolving titanium from such materials in acid in the presence of a reducing agent containing sulphur and a metal, which agent has previously been subjected to heating, together with an iron oxide, and a compound of titanium.

17. The process of treating titaniferous materials, which comprises directly dissolving titanium from such materials in acid in the presence of pyrite, which has previously been subjected to heating, together with a substance containing iron.

18. The process of treating titaniferous materials, which comprises directly dissolving titanium from such materials in acid in the presence of pyrite which has previously been subjected to a heating, together with an iron oxide and a compound of titanium.

19. The process of treating titaniferous materials, which comprises the direct dissolution of titanium from such materials by means of an acid in the presence of a titanium sulphide.

20. The process of treating titaniferous materials, which comprises the direct dissolution of titanium from said materials by means of an acid in the presence of an alkali sulphide.

PEDER FARUP.